Figure 1:
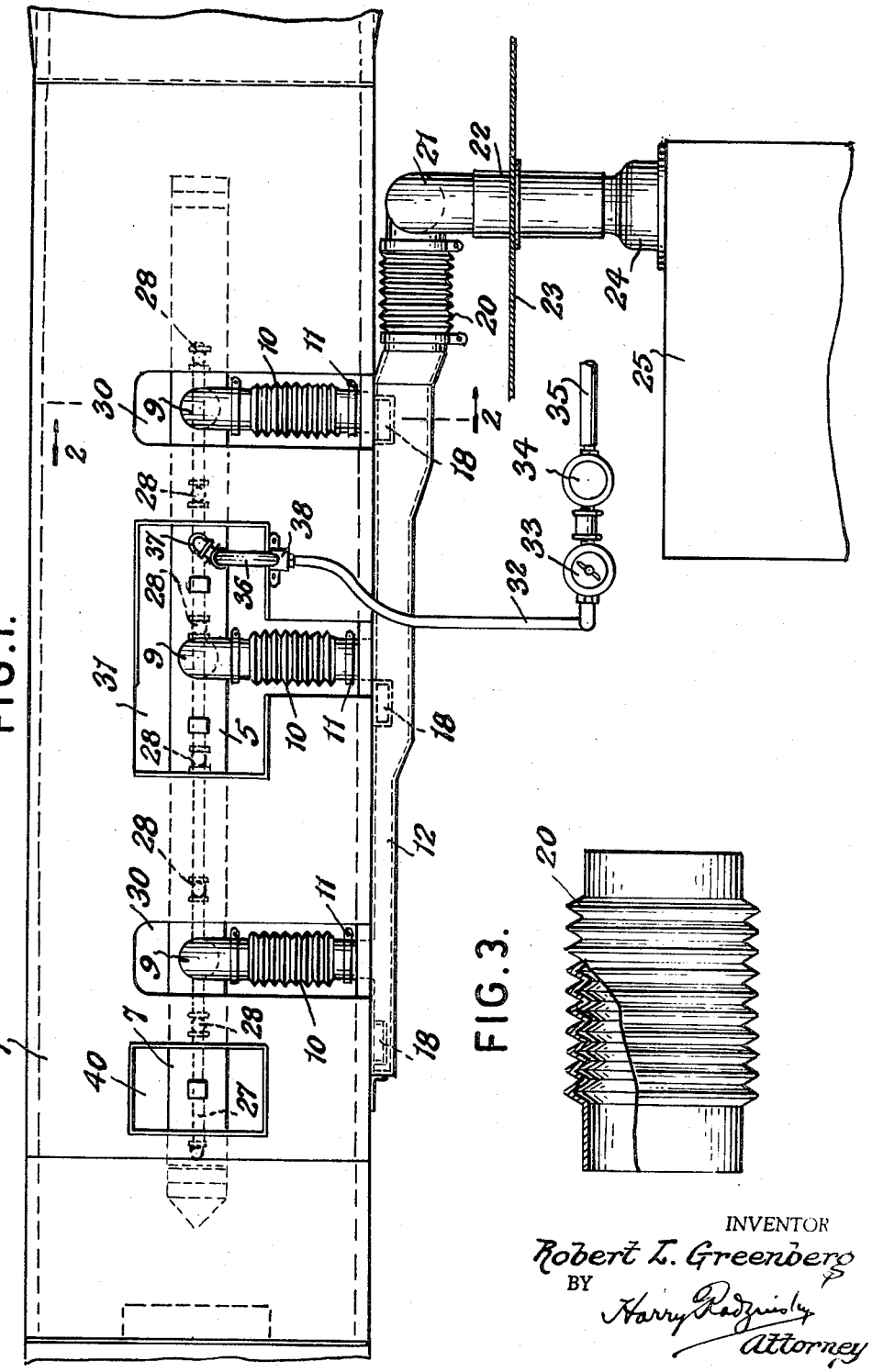

June 7, 1960

R. L. GREENBERG 2,939,408

STARCH COLLECTING APPARATUS FOR CONFECTIONERY MACHINES

Filed Jan. 2, 1959

2 Sheets-Sheet 1

INVENTOR
Robert L. Greenberg
BY
Harry Radzinsky
Attorney

June 7, 1960

R. L. GREENBERG 2,939,408

STARCH COLLECTING APPARATUS FOR CONFECTIONERY MACHINES

Filed Jan. 2, 1959

2 Sheets-Sheet 2

INVENTOR.
Robert L. Greenberg
by Harry Radzinsky
Attorney

United States Patent Office 2,939,408
Patented June 7, 1960

2,939,408
STARCH COLLECTING APPARATUS FOR CONFECTIONERY MACHINES

Robert L. Greenberg, Englewood, N.J., assignor to National Equipment Corporation, New York, N.Y., a corporation of New York Filed Jan. 2, 1959, Ser. No. 784,616
4 Claims. (Cl. 107—44)

This invention relates to confectionery machines and more particularly to a portion of the machine known under the trademark "Mogul" and by which candies are deposited into a starch mold and later the starch and the candies are dumped onto a screen which is provided, adjacent to one end, with an area of bristles over which a swinging brush is operative. The action of the brush and the tumbling of the candies over the bristled area of the screen subjects the candies to a cleansing action for the removal of adherent starch which is collected for re-use.

In the operation of an apparatus of the above construction, a considerable quantity of starch dust is stirred up and is not removed. As a result, the dust thus raised tends to settle back on the candies. Also the swinging brushes and bed brushes, while acting to remove starch from the outside surfaces of the candies, often fails to reach into crevices of the candies or to dislodge starch particles adhering to the candies.

It is one of the objects of the present invention to provide a combination of air blast and suction means by which the starch adherent to the candies will be more effectively removed. It is an object of the invention to provide means for confining and removing starch dust freed from the candies by the action of the swinging brush and bed brushes thereon as well as by the air blast and suction to which the candies are subjected.

More particularly, the invention contemplates the provision of a swinging brush as above described, and to means by which air under pressure will be ejected through nozzles associated with the brush during the swinging movements of the brush.

It is a further object of the invention to provide means by which a suctional effect is had through the brush head to thereby cause dislodged starch dust to be drawn up through the brush head and captured in a suitably positioned collection chamber, together with such air-borne starch as may be conveyed thereto by the air under pressure.

By the employment of nozzles ejecting compressed air, blasts of such air are directed at the candies, and which air under pressure reaches the candies and particularly the crevices therein and tends to dislodge the starch therein and that which tends to adhere to the candies. Such treatment is particularly effective when the candy pieces bear a design or markings on their surfaces, such as in the case of marshmallow peanuts, spearmint leaves, orange slices and many other candies not having a smooth, continuous outer surface.

In addition to the above-described air blast nozzles, the suction exerted through the head of the swinging brush is operative in a chamber in which the brushes are located and through which the candies are moved, and the suction effective in such chamber acts to remove the starch dust thereby preventing it from settling back on the candies and from which it may have been dislodged by the blasts of compressed air.

With these and other objects to be hereinafter set forth in view, I have devised the arrangement of parts to be described and more particularly pointed out in the claims appended hereto.

Figure 2:
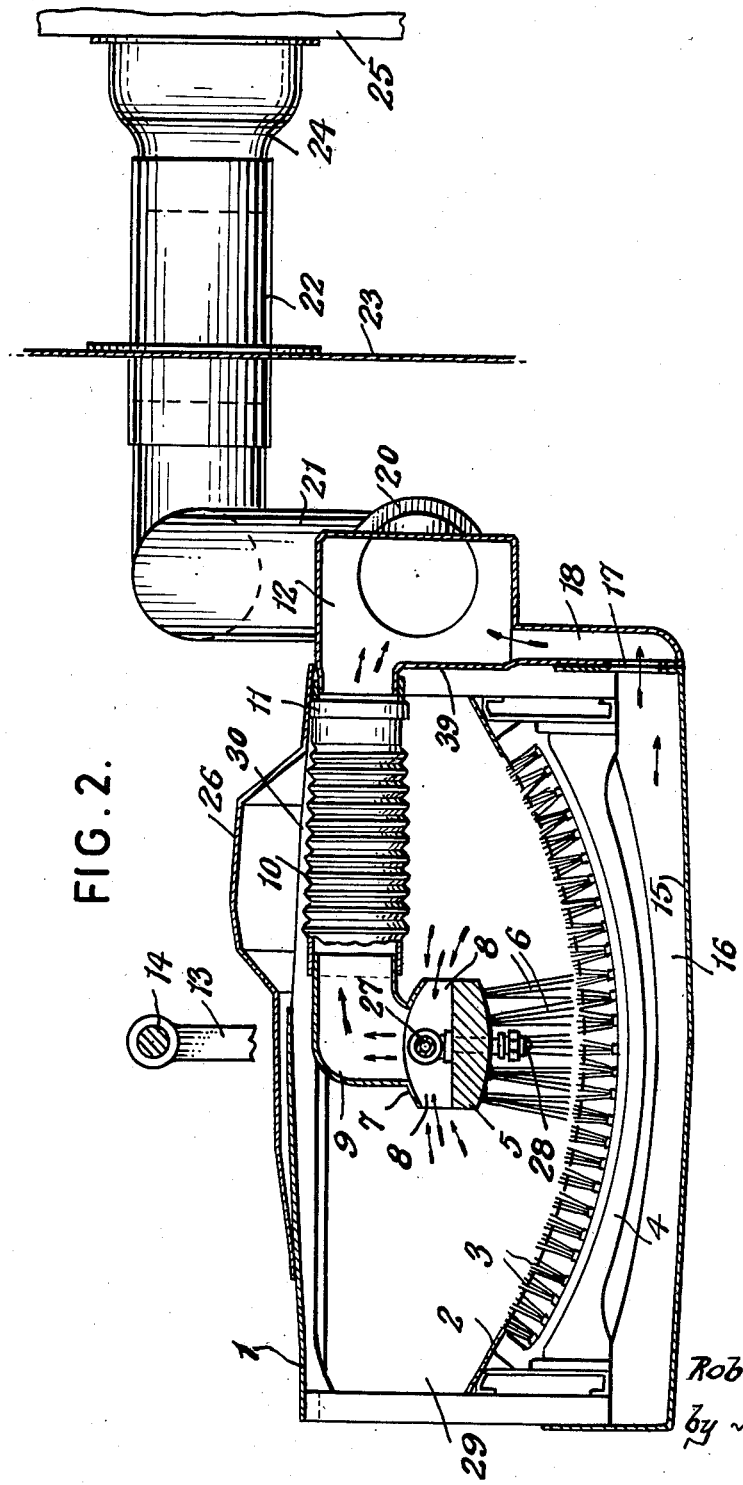

In the accompanying drawings, wherein an illustrative embodiment of the invention is disclosed, Fig. 1 is a top plan view of the mechanism forming the subject matter of the present invention;

Fig. 2 is a sectional view, taken substantially on the line 2—2 of Fig. 1, looking in the direction of the arrows, and Fig. 3 is an elevational view, with a portion broken away, of one of the flexible connection tubes.

Referring to the drawings, 1 indicates generally, a housing or casing in which the screen over which the candies are deposited, is located. This screen includes a mesh or foraminous area 2, having bristles 3 projecting through the openings in the screen. The screen is supported in the casing in any suitable manner, such as by the transverse bars 4 which extend across the interior of the casing. In general, the construction of this type of screen is known, an example thereof being found in Patent No. 2,507,930, dated May 16, 1950, and issued to George S. Perkins.

Mounted above the screen 2 is a swinging brush 5, adapted to swing back and forth, or from left to right and vice versa as viewed in Fig. 2. The mounting of the brush and the mechanism for swinging or oscillating it is known in this art and is therefore not described in detail herein. However, a part of one of the links on which the brush 5 is suspended is shown at 13 in Fig. 2 and the shaft on which the links are hung is shown at 14. Bristles 6, extending towards those in the screen, project from the bottom of the brush head and as the brush is swung back and forth these bristles 6 contact the candies and aid in dislodging the adherent mold starch therefrom.

Extending for substantially the length of the brush head, is an air pipe 27 provided at spaced intervals with outlet nozzles 28 positioned below the bottom of the brush head among the bristles 6 thereon. In the operation of the brush, air under pressure is ejected from the nozzles 28 toward and onto the candies to aid in removing the starch therefrom. Connected to the pipe 27 is a coupling 37 to which a flexible tube 36 has one end connected, said tube extending upwardly and through an opening 31 in the top wall of the housing or casing 1, said tube 36 having its opposite end connected at 38 to a pipe 32 connected to an air regulator 33 of known construction for controlling the pressure of the air, and which connects to a moisture separator 34 also of known construction from which piping 35 extends to a source of the air under pressure. This arrangement is such that the air under pressure will flow through the piping above described and be ejected out of the nozzles 28 and onto the candies and starch located on and passing over the screen 2. On passing through the screen 2, the air flow and the starch entrained by it will descend into the lower part of the housing or casing 1, below the screen and enclosed at the bottom by the casing wall 15, said portion of the casing being indicated at 16. From the lower portion 16 of the housing, the air and entrained starch will flow through outlets 17 and into passages 18 which communicate with duct 12. The duct 12 extends along the outside of side wall 39 of the housing or casing 1 and at one end the duct 12 is connected to a bellows connection 20. The bellows connection 20 is composed of flexible material such as rubber or some material having the characteristics of rubber and the bellows is corrugated in accordion-fashion so that the bellows connection is capable of both elongation and flexibility to thereby absorb vibration during the operation of the apparatus. In addition to absorbing vibration, the bellows connection 20 permits the swinging movements of the screen.

The upper portion 7 of the brush 5 is in the form of a hollow, elongated casing forming a lengthy, continuous air passage extending for the length of the brush head, said passage being open at the sides, as indicated at 8 in Fig. 2, so that air and starch dust can be suctionally drawn into said passage and out through ducts in communication with the duct shown at 12. In the embodiment shown there are three ducts extending between the air passage in the brush and the duct 11 and since the same are similar in construction, a description of one of them will suffice for the others.

Each of the ducts above mentioned, includes an elbow 9 connected at the top of the brush, and having its opposite end attached to a bellows connector 10 similar in material and construction to that shown at 20. The opposite end of the bellows connector is attached at 11 to a nipple extending from the duct 12. These bellows connectors 10 are of such nature that they can expand and contract during swinging movements of the brush, but will neither collapse nor flatten during such movements.

The bellows connector shown at 20 is connected to an outlet pipe 21 attached to the sleeve 22 supported in a wall portion 23 of the machine. Sleeve 22 is attached to a coupling 24 connected to a starch dust collector from which suction is exerted to draw the starch through duct 12 and connected piping into the collection chamber of the collector 25.

From the foregoing, the structure and operation of the described apparatus will be apparent. When the machine is in operation and the brush 5 is being swung back and forth, with the candies on the screen 2 being cleaned thereby, the air nozzles will direct air blasts against the candies and will greatly aid in the dislodgement of the starch therefrom, the compressed air impinging against the candies and reaching the crevices therein and dislodging the starch particles therefrom as well as removing the starch tending to adhere to the candies. The chamber located above the screen is that in which the candies are located and accordingly this is the primary area from which the starch dust must be removed in order that it shall not be permitted to settle back on the candies from which it was loosened by the blasts of compressed air. Suction exerted through the duct 12 by the means previously described, will tend to draw the starch dust up through the head of the brush and out through duct elements 9 and 10 and through duct 12 to the collector. This will thus prevent re-settlement of the starch dust on the candies. Suction exerted through the lower portion 16 of the housing prevents the compressed air from coming into contact with starch that is being carried by the scrapers in a machine of this type, below the screen. The described arrangement is such that not only is the maximum amount of starch removed from the candies, but it is captured or collected, and it maintains a dust-free atmosphere around the machine and facilitates the cleaning operation.

The moisture separator shown at 34 assures that the air being blown on the candies is dry and free from moisture. The pressure of the air that is blown against the candies can be regulated so that a light film of the starch can be left on the candies in order to prevent them from adhering to one another.

In the drawings, and particularly in Fig. 1 thereof, openings 30, 31 and 40 are shown in the top wall of the housing 1, primarily for access to parts of the brush and to provide access to and freedom for flexure of the several bellows 10. Covers 26 are employed to close these openings while the machine is in operation.

Having described a single embodiment of the invention, it is obvious that the same is not to be restricted thereto, but is broad enough to cover all structures coming within the scope of the annexed claims.

What I claim is:

1. In a confectionery machine, a bristled screen, a housing enclosing the same, a swinging brush located above the screen and having a bristled head carrying bristles directed toward those in the screen for the dislodgment of starch particles by the brush from candies on the screen, an air conduit carried by the brush head and provided with a plurality of air blast nozzles located amid the bristles on the brush and having outlets directed toward the screen, means for supplying air under pressure into the conduit for discharge from the nozzle outlets and dislodgment of starch from candies on the screen whereby starch particles are entrained and carried through the screen, the housing having a chamber below the screen into which air and starch entrained thereby is forced by air from the nozzles, a duct leading into a suction source, passages leading from the chamber into said duct, a suction chamber on the brush head in communication with the interior of the housing above the screen, and conduit means connecting said suction chamber with the duct for removal of dislodged starch particles.

2. In a confectionery machine as provided for in claim 1, wherein the conduit means which connects the suction chamber with the duct consists of a plurality of separate conduits, each of which includes an expansible, elongatable tube which permits swinging movement of the brush.

3. In a confectionery machine, a housing, a bristled screen contained therein, a swinging brush located above the screen and having a bristled head provided with bristles directed downwardly and toward those in the screen for the dislodgment of starch from the candies by the brush swinging over the screen, piping carried by the head and provided with a plurality of spaced-apart air-blast nozzles directed downwardly through the head and positioned among the bristles on the head and having outlets directed toward the screen, means including flexible tubing for supplying air under pressure to the piping, the housing having a chamber located below the screen into which air and starch entrained therewith by air from the nozzles is forced, a suction source, a duct communicating therewith, passages leading from the chamber into the duct, the head of the brush having a hollow part open to communication with the interior of the housing above the screen for removal of starch particles dislodged from the candies, and conduit means connecting said suction chamber with the duct, said means including bellows connections.

4. In a confectionery machine, a screen on which candies and starch are received, a swinging brush operative above the screen to dislodge the starch from the candies, the brush having a hollow head with openings in its sides, means for suctionally drawing starch through said side openings and into the head and including a collection chamber and ducts leading from the head to said chamber, to thereby cause the starch to be suctionally conveyed from the head of the brush to the collection chamber, said ducts including corrugated, elongatable bellows connections of flexible material, said bellows connections being expansible to permit of the swinging movements of the brush, air-nozzles carried by the head, air-supply means leading to the head and coupled to said air nozzles, said nozzles extending below the head and below the openings in the sides of the head, and from which nozzles air blasts are directed toward the screen for the dislodgement of starch from the candies.

References Cited in the file of this patent

UNITED STATES PATENTS

| | | |
|---|---|---|
| 1,169,602 | Bausman | Jan. 25, 1916 |
| 1,405,067 | Nuss et al. | Jan. 31, 1922 |
| 2,232,218 | Doty | Feb. 18, 1941 |
| 2,536,902 | Beckett | Jan. 2, 1951 |
| 2,648,295 | Greenberg et al. | Aug. 11, 1953 |

FOREIGN PATENTS

| | | |
|---|---|---|
| 5,696 | Great Britain | Oct. 20, 1899 |